(12) United States Patent
Norton et al.

(10) Patent No.: US 7,527,477 B2
(45) Date of Patent: May 5, 2009

(54) ROTOR BLADE AND METHOD OF FABRICATING SAME

(75) Inventors: Brian Norton, Cincinnati, OH (US); Francis Bobie, W. Chester, OH (US); John Heyward, Loveland, OH (US); Dwayne Burnett, Phoenix, AZ (US)

(73) Assignee: General Electric Company, Schenectady, NY (US)

( * ) Notice: Subject to any disclaimer, the term of this patent is extended or adjusted under 35 U.S.C. 154(b) by 415 days.

(21) Appl. No.: 11/461,108

(22) Filed: Jul. 31, 2006

(65) Prior Publication Data

US 2008/0025841 A1 Jan. 31, 2008

(51) Int. Cl.
*F01D 5/14* (2006.01)

(52) U.S. Cl. ............... 416/191; 416/192; 415/173.6; 29/889.2

(58) Field of Classification Search ............ 415/173.1, 415/173.5, 173.6, 174.5; 416/189, 191, 212 R, 416/212 A; 29/889.7
See application file for complete search history.

(56) References Cited

U.S. PATENT DOCUMENTS

| | | | |
|---|---|---|---|
| 4,484,859 A | 11/1984 | Pask et al. | |
| 5,211,540 A | 5/1993 | Evans | |
| 5,906,179 A | 5/1999 | Capdevila | |
| 6,224,341 B1 | 5/2001 | Fricke | |
| 6,491,498 B1 * | 12/2002 | Seleski et al. | 416/191 |
| 6,926,495 B2 * | 8/2005 | Diakunchak | 415/173.3 |
| 7,001,152 B2 * | 2/2006 | Paquet et al. | 416/190 |

* cited by examiner

*Primary Examiner*—Ninh H Nguyen
(74) *Attorney, Agent, or Firm*—William Scott Andes, Esq.; Armstrong Teasdale LLP (57) ABSTRACT

A method for fabricating a rotor blade is provided. The method includes providing a rotor blade that includes a tip shroud having a portion of increased cross-sectional thickness relative to adjacent portions of the tip shroud. The increased cross-sectional thickness section extends across substantially an entire circumferential width of the tip shroud. The increased cross-sectional thickness section defines a pair of opposite interlock surfaces that each form a portion of a respective side of the pair of opposite tip shroud sides used for interlocking the tip shrouds of two adjacent rotor blades on the rotor. The method also includes removing a portion of the increased cross-sectional thickness section between the pair of opposite tip shroud sides to facilitate enhancing the efficiency of the rotor blade.

16 Claims, 7 Drawing Sheets

ROTOR BLADE AND METHOD OF FABRICATING SAME

BACKGROUND OF THE INVENTION

This invention relates generally to turbine engines, and more particularly to rotor blades used with turbine engines.

At least some known gas turbine engines include a compressor, a combustor, and at least one turbine. The compressor compresses air that is thereafter channeled to the combustor, wherein it is mixed with a fuel and ignited to generate combustion gases. The combustion gases are channeled to the turbine, which extracts energy from the combustion gases to drive the compressor. The combustion gases also produce useful work to propel an aircraft in flight or to power a load, for example an electrical generator.

Some known turbines include a rotor assembly and a stator assembly. Known rotor assemblies include a plurality of rotor blades extending radially outward from a disk. More specifically, each rotor blade extends radially between a platform, adjacent the disk, and a blade tip. A flow of combustion gases through the rotor assembly is bound radially inward by the rotor blade platforms, and radially outward by a shroud extending from each blade tip, sometimes referred to as a tip shroud. At least some known tip shrouds may have a weight that may cause the rotor assembly to resonate at a different frequency than other components of the engine, for example the stator assembly. Over time, continued engine operation with such frequency differences may cause damage to, and/or failure of, the rotor assembly and/or other components of the engine.

BRIEF DESCRIPTION OF THE INVENTION

In one aspect, a method for fabricating a rotor blade is provided. The method includes providing a rotor blade that includes a tip shroud having a portion of increased cross-sectional thickness relative to adjacent portions of the tip shroud. The increased cross-sectional thickness section extends across substantially an entire circumferential width of the tip shroud. The increased cross-sectional thickness section defines a pair of opposite interlock surfaces that each form a portion of a respective side of the pair of opposite tip shroud sides used for interlocking the tip shrouds of two adjacent rotor blades on the rotor. The method also includes removing a portion of the increased cross-sectional thickness section between the pair of opposite tip shroud sides to facilitate enhancing the efficiency of the rotor blade.

In another aspect, a rotor blade includes an airfoil extending radially between a blade root and a blade tip, and a tip shroud extending from the blade tip. The tip shroud includes a pair of opposite sides, a circumferential width measured between the pair of opposite sides, and a first section of increased cross-sectional thickness relative to at least some adjacent portions of the tip shroud. The first cross-sectional thickness section is adjacent to a first side of the pair of opposite sides and defines a first interlock surface that forms a portion of the first side. The tip shroud also includes a second section of increased cross-sectional thickness relative to at least some adjacent portions of the tip shroud. The second cross-sectional thickness section is adjacent to a second side of the pair of opposite sides and defines a second interlock surface that forms a portion of the second side. The tip shroud also includes an intermediate portion extending along the circumferential width between the first and second increased cross-sectional thickness sections. The intermediate portion includes a reduced cross-sectional thickness relative to the first and second increased cross-sectional thickness sections.

In another aspect, a rotor includes a rotor disk and a plurality of circumferentially-spaced rotor blades extending from the rotor disk. Each of the rotor blades include an airfoil extending radially between a blade root and a blade tip, and a tip shroud extending from the blade tip. The tip shroud includes a pair of opposite sides, a circumferential width measured between the pair of opposite sides, and a first section of increased cross-sectional thickness relative to at least some adjacent portions of the tip shroud. The first cross-sectional thickness section is adjacent a first side of the pair of opposite sides and defines a first interlock surface that forms a portion of the first side. The tip shroud also includes a second section of increased cross-sectional thickness relative to at least some adjacent portions of the tip shroud. The second cross-sectional thickness section is adjacent a second side of the pair of opposite sides and defines a second interlock surface that forms a portion of the second side. The tip shroud also includes an intermediate portion extending along the circumferential width between the first and second increased cross-sectional thickness sections. The intermediate portion includes a reduced cross-sectional thickness relative to the first and second increased cross-sectional thickness sections.

DETAILED DESCRIPTION OF THE INVENTION

Figure 1:
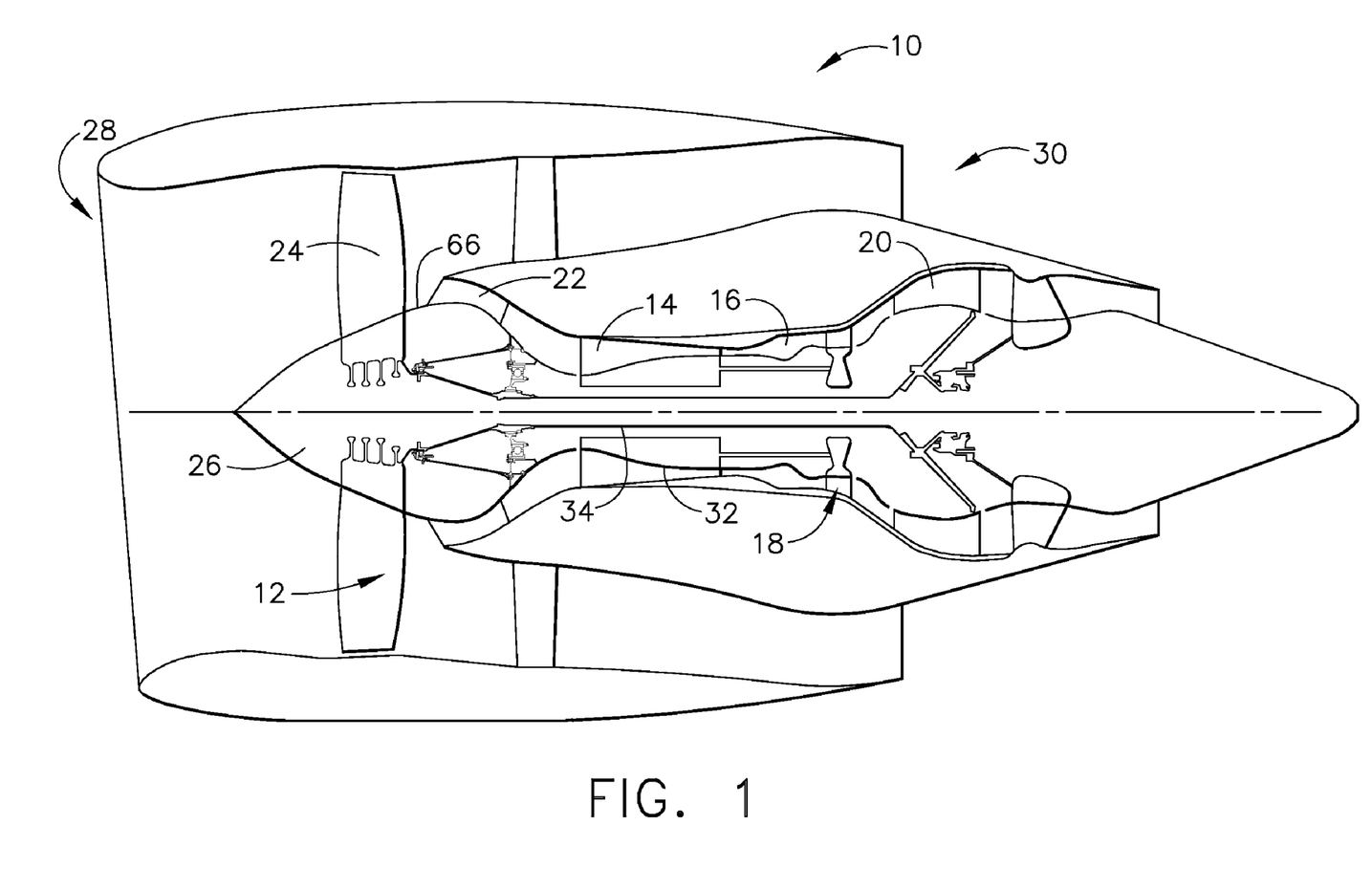
FIG. 1 is a cross-sectional schematic view of an exemplary gas turbine engine.

FIG. 1 is a schematic illustration of an exemplary gas turbine engine 10 including a fan assembly 12, a high pressure compressor 14, and a combustor 16. Engine 10 also includes a high pressure turbine 18, a low pressure turbine 20, and a booster 22. Fan assembly 12 includes an array of fan blades 24 extending radially outward from a rotor disc 26. Engine 10 has an intake side 28 and an exhaust side 30. Gas turbine engine 10 may be any gas turbine engine. For example, gas turbine engine 10 may be, but is not limited to being, a GE90 available from General Electric Company, Cincinnati, Ohio. Fan assembly 12, booster 22, and turbine 20 are coupled by a first rotor shaft 32, and compressor 14 and turbine 18 are coupled by a second rotor shaft 34.

In operation, air flows through fan assembly 12 and compressed air is supplied to high pressure compressor 14 through booster 22. The highly compressed air is delivered to combustor 16, wherein it is mixed with a fuel and ignited to generate combustion gases. The combustion gases are channeled from combustor 16 to drive turbines 18 and 20. Turbine 20 drives fan assembly 12 and booster 22 by way of shaft 32. Turbine 18 drives compressor 14 by way of shaft 34.

Figure 2:
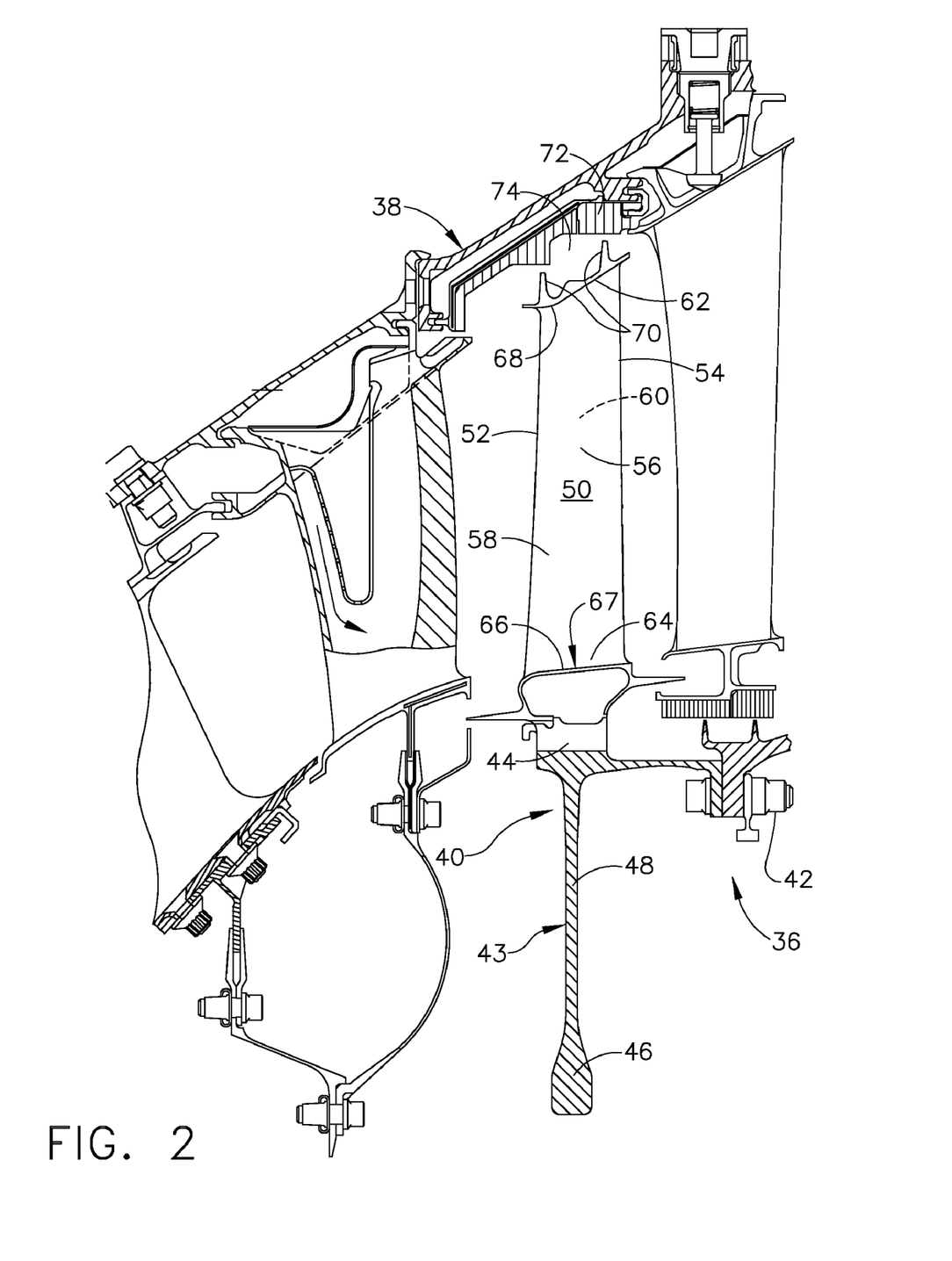
FIG. 2 is a partial cut-away cross-sectional view of an exemplary rotor assembly and an exemplary stator assembly that may be used with a gas turbine engine, such as the gas turbine engine shown in FIG. 1.
Figure 3:
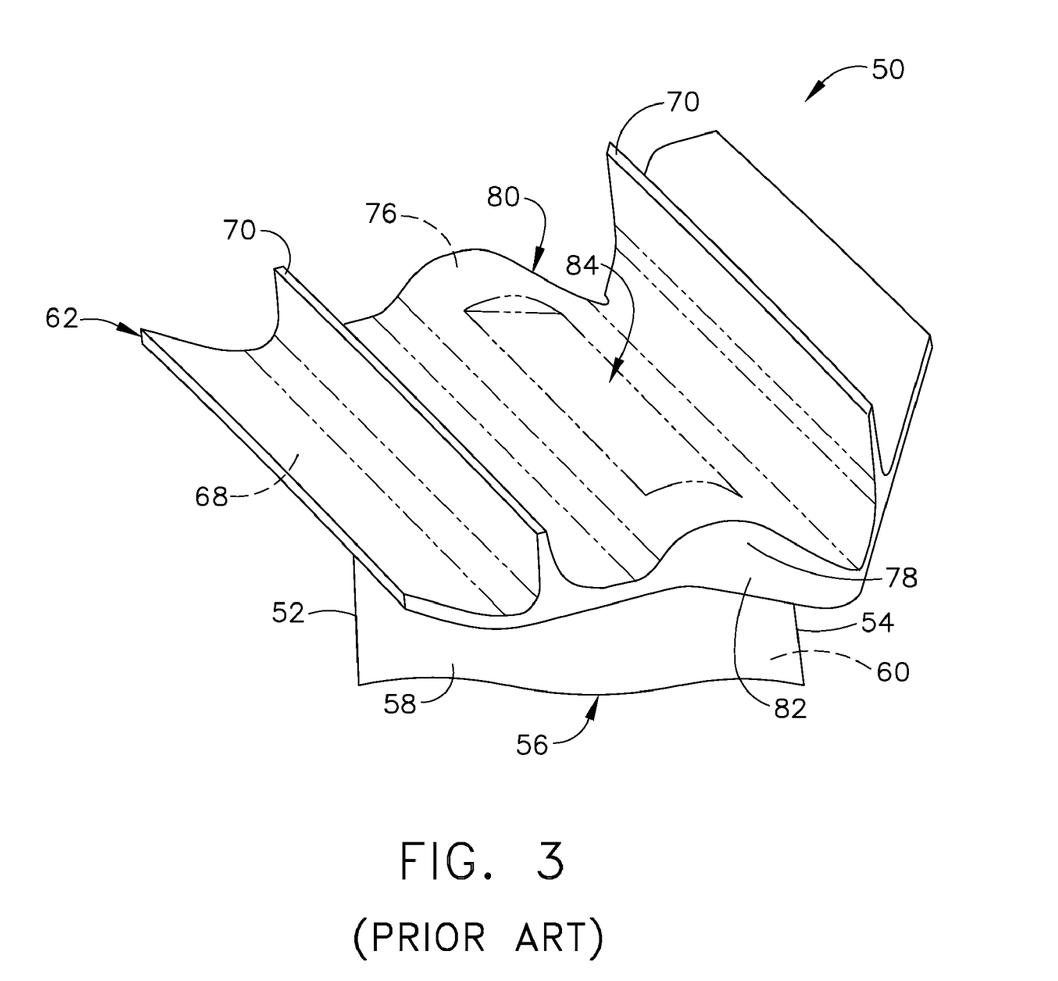
FIG. 3 is a perspective view of a portion of an exemplary known rotor blade that may be used with a gas turbine engine, such as the gas turbine engine shown in FIG. 1.
Figure 4:
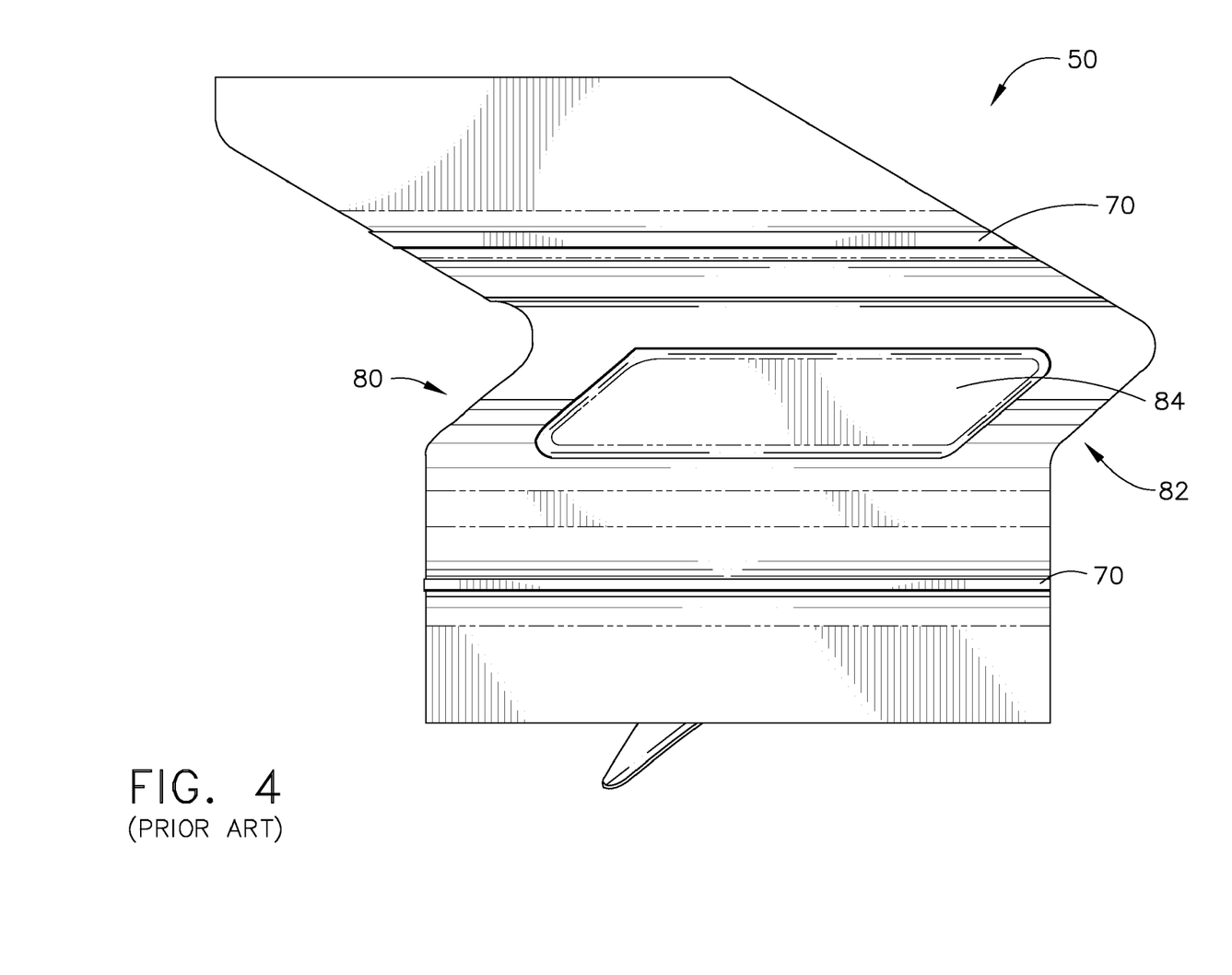
FIG. 4 is a top plan view of the rotor blade shown in FIG. 3.

FIG. 2 is a partial cut-away cross-sectional view of an exemplary rotor assembly 36 and an exemplary stator assembly 38 that may be used with a gas turbine engine, such as, but not limited to, gas turbine engine 10 (shown in FIG. 1). FIG. 3 is a perspective view of a portion of an exemplary known rotor blade 50 that may be used with a gas turbine engine, such as, but not limited to, gas turbine engine 10 (shown in FIG. 1). FIG. 4 is a top plan view of known rotor blade 50 shown in FIG. 3. In the exemplary embodiment, rotor assembly 36 is a turbine, such as, but not limited to, low pressure turbine 20 (shown in FIG. 1). However, it should be noted, the exemplary methods and blades described and/or illustrated herein may be used with any rotor assembly. Rotor assembly 36 includes a plurality of rotors 40 joined together by couplings 42 about an axial centerline axis (not shown). Each rotor 40 includes a rotor disk 43 including an annular radially outer rim 44, a radially inner hub 46, and an integral web 48 extending radially therebetween. Each rotor 40 also includes a plurality of blades 50 extending radially outwardly from outer rim 44. One or more blades 50, of one or more rotors 40, may be integrally joined with respective rims 44. Moreover, one or more blades 50 of one or more rotors 40 may be removably joined to respective rim 44 in a known manner using blade dovetails (not shown) which mount in complementary slots (not shown) in a respective rim 44.

Rotor blades 50 each include a leading edge 52, a trailing edge 54, and an airfoil 56 extending therebetween. Each airfoil 56 includes a suction side 58 and a circumferentially opposite pressure side 60. Suction and pressure sides 58 and 60, respectively, extend between axially-spaced-apart leading and trailing edges 52 and 54, respectively, and extend in radial span between a rotor blade tip shroud 62 and a rotor blade root 64. A blade chord is measured between rotor blade trailing and leading edges 54 and 52, respectively. Rotor blades 50 cooperate with a motive or working fluid, such as air and/or combustion gases. As combustion gases flow from stage to stage of rotor assembly 36, outer surfaces 66 of platforms 67 define a radially inner flowpath surface of rotor assembly 36 and a radially inner surface 68 of each blade tip shroud 62 defines a radially outer flowpath surface of rotor assembly 36.

In the exemplary embodiment, rotor blades 50 each include one or more rotor seal teeth 70, which rotate adjacent to a stator shroud 72, and through a cavity 74 defined by stator shroud 72 and rotor blade tip shroud 62. Although each blade tip shroud 62 is illustrated in FIGS. 2 and 3 as including only two seal teeth 70 that each extend across an entire circumferential width of shroud 62 (shown in FIG. 3) from a concave side 80 to an opposite convex side 82 of tip shroud 62. It should be noted that each tip shroud 62 may include any number of seal teeth 70 that may each extend across any portion of the circumferential width of shroud 62 between tip shroud concave side 80 and convex side 82. Moreover, each tip shroud 62 also includes a pair of opposite interlock surfaces 76 and 78 that facilitate interlocking shrouds 62 of adjacent rotor blades 50 within a rotor 40. Interlock surface 76 forms a portion or section of concave side 80 of each tip shroud 62, while interlock surface 78 forms a portion or section of convex side 82 of each tip shroud 62. In the exemplary embodiment, interlock surfaces 76 and 78 are each defined by a portion or section 84 of tip shroud 62 that extends between two adjacent seal teeth 70 across the entire circumferential width of tip shroud 62 between tip shroud concave side 80 and convex side 82. Tip shroud portion 84 has an increased cross-sectional thickness (which in blade 50 is variable, but is not variable in other known blades not shown herein) relative to adjacent portions of tip shroud 62.

Figure 5:
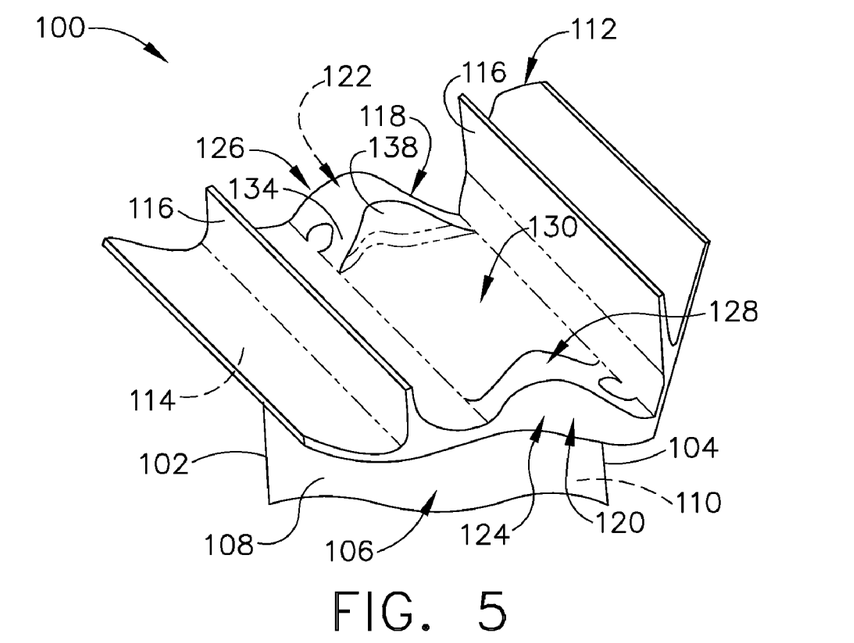
FIG. 5 is a perspective view of a portion of an exemplary rotor blade that may be used with a gas turbine engine, such as the gas turbine engine shown in FIG. 1.
Figure 6:
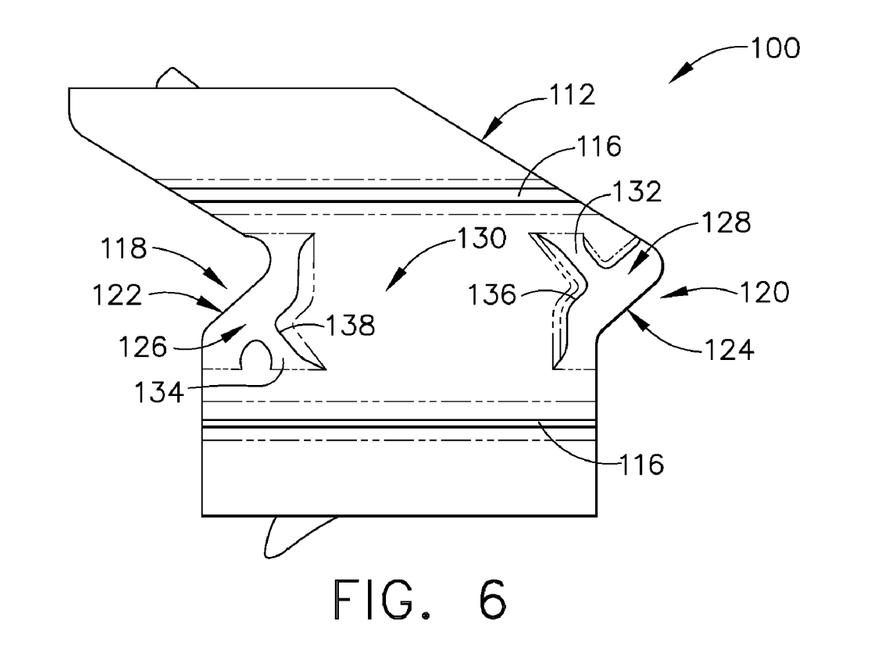
FIG. 6 is a top plan view of the rotor blade shown in FIG. 5.

FIG. 5 is a perspective view of a portion of an exemplary rotor blade 100 that may be used with a gas turbine engine, such as, but not limited to, gas turbine engine 10 (shown in FIG. 1). FIG. 6 is a top plan view of rotor blade 100. Although rotor blade 100 may be any type of rotor blade that may be used with any suitable type of rotor assembly, in the exemplary embodiment rotor blade 100 is described and/or illustrated herein with respect to, but is not limited to being used with, rotor assembly 36 (shown in FIG. 2) and gas turbine engine 10 (shown in FIG. 1). Rotor blade 100 includes a leading edge 102, a trailing edge 104, and an airfoil 106 extending therebetween. Each airfoil 106 includes a suction side 108 and a circumferentially opposite pressure side 110. Suction and pressure sides 108 and 110, respectively, extend between axially spaced apart leading and trailing edges 102 and 104, respectively, and extend in radial span between a rotor blade tip shroud 112 and a rotor blade root (not shown). A blade chord is measured between rotor blade trailing and leading edges 104 and 102, respectively. In the exemplary embodiment, rotor blade 100 is configured to cooperate with a motive or working fluid, such as, but not limited to, air and/or combustion gases. For example, as combustion gases flow from stage to stage of rotor assembly 36, outer surfaces 66 of blade platforms 67 (shown in FIG. 2) define a radially inner flowpath surface of rotor assembly 36 and a radially inner surface 114 of blade tip shroud 112 defines a radially outer flowpath surface of rotor assembly 36.

In the exemplary embodiment, rotor blade 100 includes two seal teeth 116. However, rotor blade 100 may include any number of seal teeth 116. Moreover, in the exemplary embodiment, shroud 112 includes seal teeth 116 that each extend across an entire circumferential width of shroud 112 from a concave side 118 to an opposite convex side 120 of tip shroud 112. Alternatively, each seal tooth 116 of shroud 112 may extend across any portion of the circumferential width of shroud 112 between tip shroud concave side 118 and convex side 120. In the exemplary embodiment, each tip shroud 112 also includes a pair of opposite interlock surfaces 122 and 124 that facilitate interlocking shrouds 112 of adjacent rotor blades 100 of rotor 40. Interlock surface 122 forms a portion or section of tip shroud concave side 118, while interlock surface 124 forms a portion or section of tip shroud convex side 120.

In the exemplary embodiment, interlock surface 122 is defined by a portion or section 126 of tip shroud 112 that has an increased cross-sectional thickness. Although portion 126 is variable in thickness, in alternative embodiments, portion 126 need not be variable relative to at least some adjacent portions of tip shroud 112. Interlock surface 124 is defined by a portion or section 128 of tip shroud 112 that also has an increased cross-sectional thickness (which in the exemplary embodiment is variable, but need not be variable in other embodiments) relative to at least some adjacent portions of tip shroud 112. An intermediate portion or section 130 of tip shroud 112 extends across a portion of the circumferential width of tip shroud 112 between portions 126 and 128. Intermediate portion 130 has a reduced cross-sectional thickness (which in exemplary embodiment is substantially consistent, but may be variable in other embodiments) relative to portions 126 and 128. In the exemplary embodiment, each portion 126, 128, and 130 extends across a portion of the circumferential width of tip shroud 112 between the two seal teeth 116. Alternatively, portions 126, 128, and 130 may each have any suitable position, location, and/or orientation, and/or portions 126, 128, and/or 130 as a group may have any suitable configuration and/or arrangement, on tip shroud 112 and/or relative to each other.

In the exemplary embodiment, portion 126 includes a support member 134 and portion 128 includes a support member 132. Each support member 132 and 134 support each respective portion 128 and 126 interlocking surfaces 122 and 124, respectively. In the exemplary embodiment, support member 132 extends from a surface 136 of portion 128 that is opposite interlock surface 124. Similarly, in the exemplary embodiment, support member 134 extends from a surface 138 of portion 126 that is opposite interlock surface 122. However, support members 132 and 134 may each have any suitable location, position, and/or orientation on tip shroud 112 and relative to the respective portion 128 and 126. Moreover, although only one support member 132 and 134 is illustrated for each portion 128 and 126, respectively, portions 126 and 128 may each include any number of support members each having any suitable location, position, and/or orientation on tip shroud 112. A group of a plurality of support members for either or both portions 126 and 128 may have any suitable configuration and/or arrangement on tip shroud 112.

Figure 7:
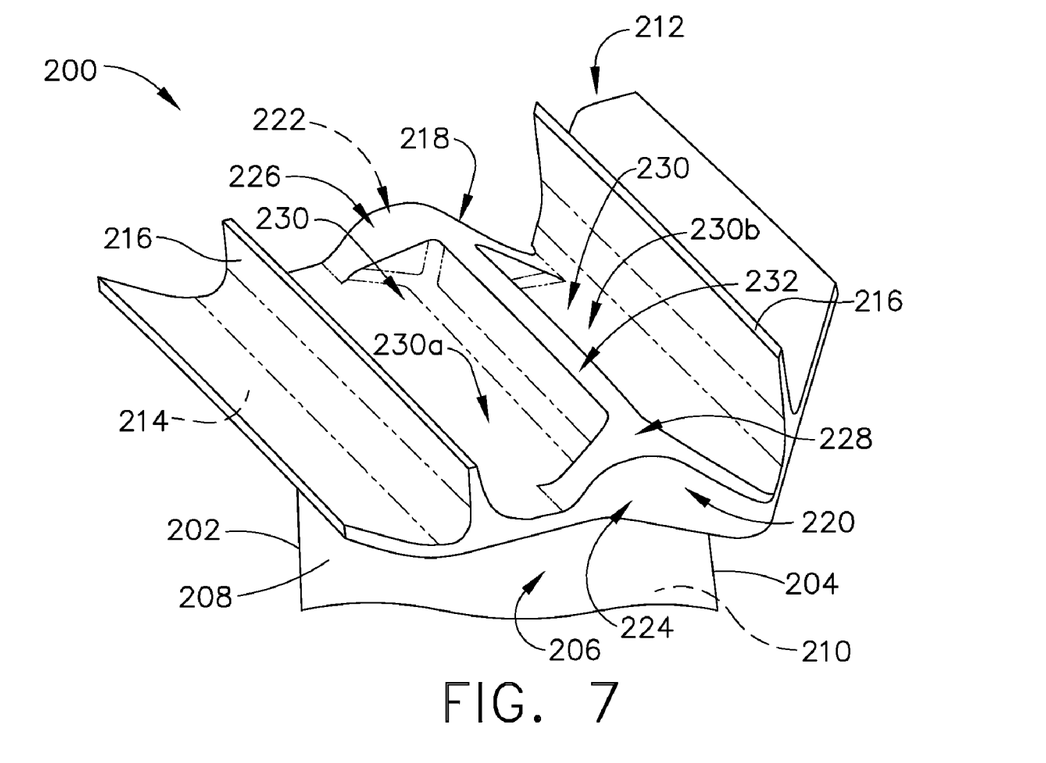
FIG. 7 is a perspective view of a portion of another embodiment of a rotor blade that may be used with a gas turbine engine, such as the gas turbine engine shown in FIG. 1.
Figure 8:
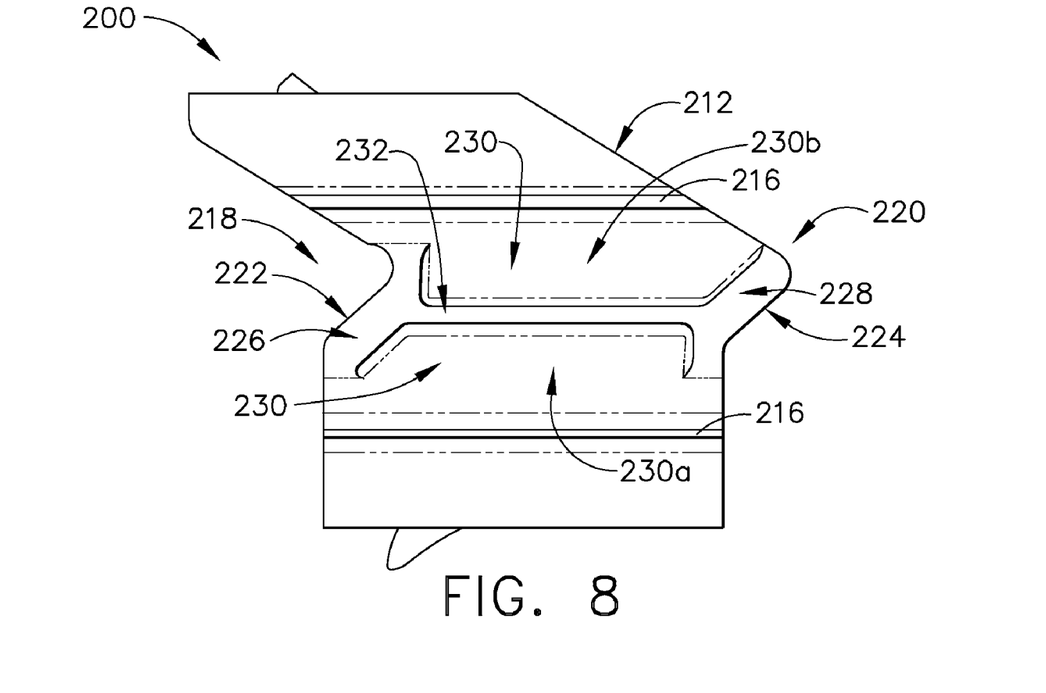
FIG. 8 is a top plan view of the rotor blade shown in FIG. 7.

FIG. 7 is a perspective view of another exemplary embodiment of a rotor blade 200 that may be used with a gas turbine engine, such as, but not limited to, gas turbine engine 10 (shown in FIG. 1). FIG. 8 is a top plan view of rotor blade 200. Although blade 200 may be any type of rotor blade that may be used with any suitable type of rotor assembly, in the exemplary embodiments blade 200 will be described and/or illustrated herein with respect to, but is not limited to being used with, rotor assembly 36 (shown in FIG. 2) and gas turbine engine 10 (shown in FIG. 1). Rotor blade 200 includes a leading edge 202, a trailing edge 204, and an airfoil 206 extending therebetween. Each airfoil 206 includes a suction side 208 and a circumferentially opposite pressure side 210. Suction and pressure sides 208 and 210, respectively, extend between axially spaced apart leading and trailing edges 202 and 204, respectively, and extend in radial span between a rotor blade tip shroud 212 and a rotor blade root (not shown). A blade chord is measured between rotor blade trailing and leading edges 204 and 202, respectively. In the exemplary embodiment, rotor blade 200 is configured for cooperating with a motive or working fluid, such as, but not limited to, air and/or combustion gases. For example, as combustion gases flow from stage to stage of rotor assembly 36, outer surfaces 66 of blade platforms 67 (shown in FIG. 2) define a radially inner flowpath surface of rotor assembly 36 and a radially inner surface 214 of blade tip shroud 212 defines a radially outer flowpath surface of rotor assembly 36.

In the exemplary embodiment, rotor blade 200 includes two seal teeth 216. However, rotor blade 200 may include any number of seal teeth 216. Moreover, shroud 212 is shown in FIGS. 7 and 8 as including seal teeth 216 that each extend an entire circumferential width of shroud 212 from a concave side 218 to an opposite convex side 220 of tip shroud 212, each seal tooth 216 of shroud 212 may extend across any portion of the circumferential width of shroud 212 between tip shroud concave side 218 and convex side 220. Each tip shroud 212 also includes a pair of opposite interlock surfaces 222 and 224 that facilitate interlocking shrouds 212 of adjacent rotor blades 200 of rotor 40. Interlock surface 222 forms a portion or section of concave side 218 of tip shroud 212, while interlock surface 224 forms a portion or section of convex side 220 of tip shroud 212. In the exemplary embodiment of blade 200, interlock surface 222 is defined by a portion or section 226 of tip shroud 212 that has an increased cross-sectional thickness (which in exemplary embodiment is variable, but need not be variable in other embodiments) relative to at least some adjacent portions of tip shroud 212, and interlock surface 224 is defined by a portion or section 228 of tip shroud 212 that also has an increased cross-sectional thickness (which in exemplary embodiment is variable, but need not be variable in other embodiments) relative to at least some adjacent portions of tip shroud 212. An intermediate portion or section 230 of tip shroud 212 extends across a portion of the circumferential width of tip shroud 212 between portions 226 and 228. Intermediate portion 230 has a reduced cross-sectional thickness relative to portions 226 and 228.

Tip shroud 212 includes another portion 232 having an increased cross-sectional thickness relative to at least some adjacent portions of tip shroud 212. Portion 232 facilitates supporting portions 226 and 228 and therefore interlock surfaces 222 and 224. Portion 232 also increases stiffness and rigidity to intermediate portion 230 such that the stiffness helps to reduce stress within tip shroud 212. In some embodiments, portion 232 may provide more support for interlock surfaces 222 and 224 than would be provided by respective support members 132 and 134 (shown in FIG. 6), although may increase a weight of tip shroud 212 as compared to tip shroud 112 (shown in FIGS. 5 and 6). Portion 232 may have any suitable location, position, and/or orientation on tip shroud 212 and relative to portions 226 and 228. For example, in the exemplary embodiment, portion 232 extends across a portion of the circumferential width of tip shroud 212 between portions 226 and 228, and more specifically from portion 226 to portion 228 such that portion 232 connects portions 226 and 228. In the exemplary embodiment, portion 232 divides intermediate portion 230 into a pair of opposite intermediate portions 230a and 230b. Moreover, in the exemplary embodiment, the cross-sectional thickness of each of intermediate portions 230a and 230b is substantially consistent, but may be variable in other embodiments. Although only one portion 232 is illustrated, tip shroud 212 may include any number of portions 232 each having any suitable location, position, and/or orientation on tip shroud 212 and relative to portions 226 and 228 dividing portion 230 into any number of intermediate portions. A group of a plurality of portions 232 may have any suitable configuration and/or arrangement on tip shroud 112.

Figure 9:
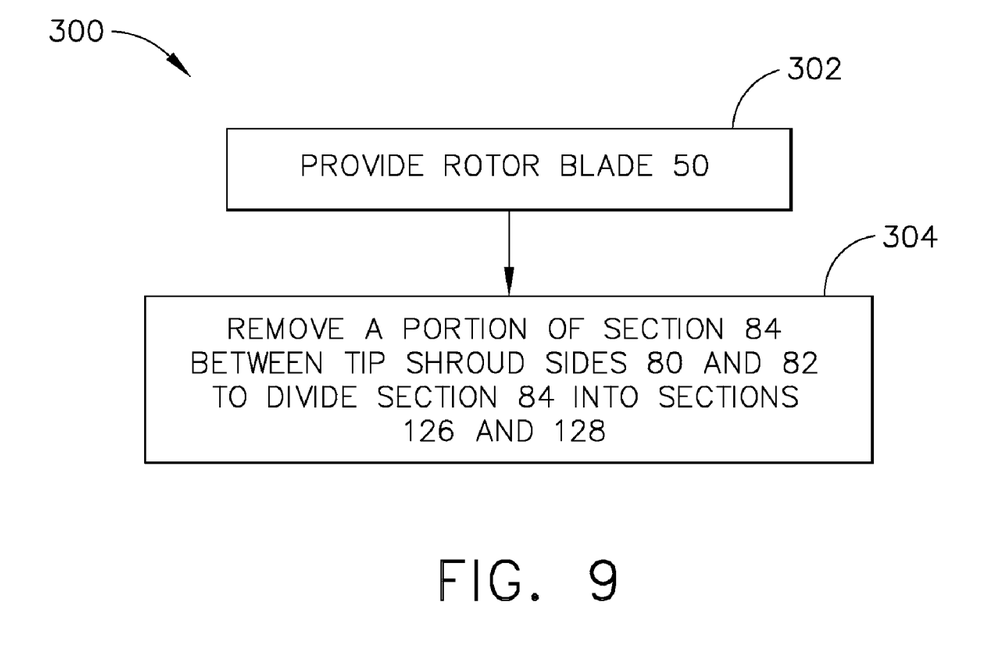
FIG. 9 is flowchart illustrating an exemplary method of fabricating a rotor blade, such as, but not limited to, the rotor blade shown in FIGS. 5 and 6.

In the exemplary embodiment, each of portions 226, 228, 230a, 230b, and 232 extend across a portion of the circumferential width of tip shroud 212 between the two seal teeth 216. However, portions 226, 228, 230a, 230b, and 232 may each have any suitable position, location, and/or orientation, and/or portions 226, 228, 230a, 230b, and/or 232 as a group may have any suitable configuration and/or arrangement, on tip shroud 212 and relative to each other, FIG. 9 is flowchart illustrating an exemplary embodiment of a method 300 of fabricating a rotor blade that may be used with a gas turbine engine, such as, but not limited to, gas turbine engine 10 (shown in FIG. 1). Although method 300 may be used to fabricate any rotor blade, method 300 will be described and/or illustrated herein with respect to fabricating rotor blade 100 (shown in FIGS. 5 and 6). Method 300 includes providing 302 rotor blade 50 (shown in FIGS. 2 and 3) and removing 304 a portion of increased cross-sectional thickness portion 84 (shown in FIG. 3) between opposite tip shroud sides 80 and 82 (shown in FIG. 3) to divide portion 84 into tip shroud portions 126 and 128 (shown in FIGS. 5 and 6). In some embodiments, removing 304 a portion of section 84 may include forming support members 132 and 134 (shown in FIGS. 5 and 6). Removing 304 a portion of section 84 may be performed using any suitable process, method, structure, and/or means, such as, but not limited to, using a conventional machining process, and/or a non-conventional machining process.

Figure 10:
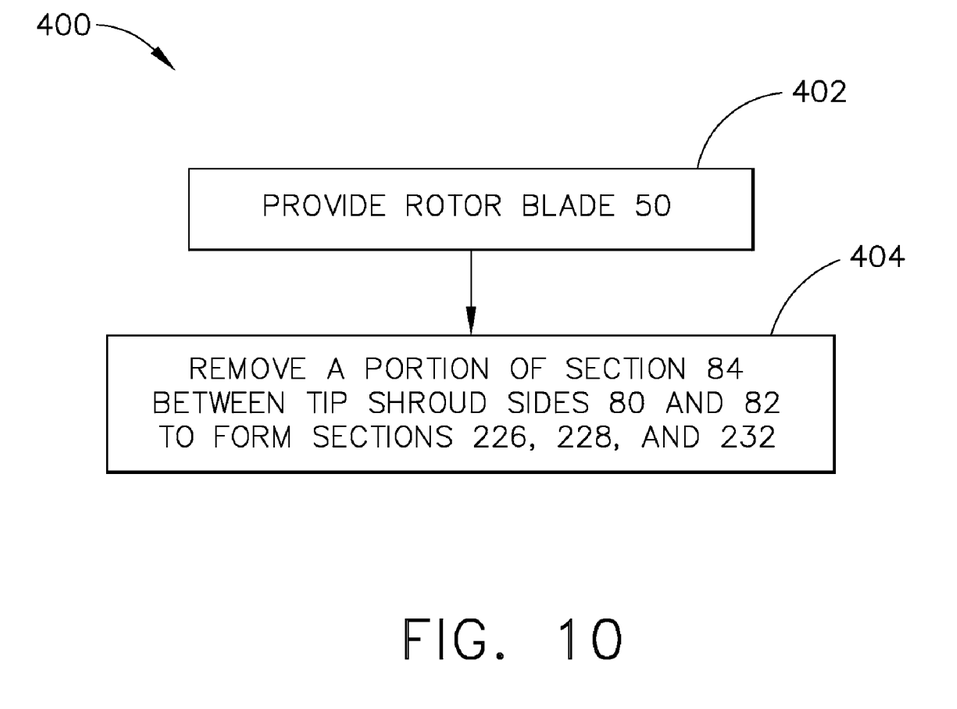
FIG. 10 is flowchart illustrating an exemplary method of fabricating a rotor blade, such as, but not limited to, the rotor blade shown in FIGS. 7 and 8.

FIG. 10 is flowchart illustrating an exemplary embodiment of a method 400 of fabricating a rotor blade that may be used with a gas turbine engine, such as, but not limited to, gas turbine engine 10 (shown in FIG. 1). Although method 400 may be used to fabricate any rotor blade, method 400 will be described and/or illustrated herein with respect to fabricating rotor blade 200 (shown in FIGS. 7 and 8). Method 400 includes providing 402 rotor blade 50 (shown in FIGS. 2 and 3) and removing 404 a portion of increased cross-sectional thickness portion 84 (shown in FIG. 3) between opposite tip shroud sides 80 and 82 (shown in FIG. 3) to form tip shroud portions 226, 228, and 232 (shown in FIGS. 7 and 8). Removing 404 a portion of section 84 may be performed using any suitable process, method, structure, and/or means, such as, but not limited to, using a conventional machining process, and/or a non-conventional machining process.

In some embodiments, rather than modifying a known blade such as blade 50 (shown in FIGS. 2 and 3), rotor blades 100 and/or 200 may be fabricated using any suitable process, method, structure, and/or means, such as, but not limited to, casting, forging and/or machining.

The methods and blades described and/or illustrated herein facilitate reducing a weight of a rotor blade tip shroud. As such, the methods and blades described herein may facilitate a rotor assembly resonating at a frequency that avoids excitation by other components. Additionally, weight reduction for an engine set is estimated to be about 620 grams for the exemplary embodiment shown in FIGS. 5 and 6, and the weight reduction for an engine set is estimated to be about 410 grams for the alternative embodiment shown in FIGS. 7 and 8. Moreover, the methods and blades described and/or illustrated herein may facilitate reducing an overall weight of a gas turbine engine such that a lighter tip shroud results in reduced blade and disc weight. This weight savings is achieved with the use of the pair of opposite interlock surfaces supported by support members while maintaining durability of the components.

Although the embodiments described and/or illustrated herein are described and/or illustrated with respect to a gas turbine engine, and more specifically to a turbine rotor assembly for a gas turbine engine, practice of the embodiments described and/or illustrated herein is not turbine rotors, not gas turbine engine generally. Rather, the embodiments described and/or illustrated herein are applicable to rotor blades for any rotor assembly.

Exemplary embodiments are described and/or illustrated herein in detail. The embodiments are not limited to the specific embodiments described herein, but rather, components and steps of each embodiment may be utilized independently and separately from other components and steps described herein. Each component, and each step, can also be used in combination with other components and/or method steps.

When introducing elements/components/etc. described and/or illustrated herein, the articles "a", "an", "the", "said", and "at least one" are intended to mean that there are one or more of the element(s)/component(s)/etc. The terms "comprising", "including" and "having" are intended to be inclusive and mean that there may be additional element(s)/component(s)/etc. other than the listed element(s)/component(s)/etc.

While the invention has been described in terms of various specific embodiments, those skilled in the art will recognize that the invention can be practiced with modification within the spirit and scope of the claims.

What is claimed is:

1. A method for fabricating a rotor blade, said method comprising:
   providing a rotor blade that includes a tip shroud having a section of increased cross-sectional thickness relative to at least some adjacent portions of the tip shroud, wherein the increased cross-sectional thickness section extends across substantially an entire circumferential width of the tip shroud, and wherein the increased cross-sectional thickness section defines a pair of opposite interlock surfaces that each form a portion of a respective side of the pair of opposite tip shroud sides used for interlocking the tip shrouds of two adjacent rotor blades on the rotor; and
   removing a portion of the increased cross-sectional thickness section between the pair of opposite tip shroud sides to facilitate enhancing the efficiency of the rotor blade.

2. A method in accordance with claim 1 wherein removing a portion of the increased cross-sectional thickness section comprises dividing the increased cross-sectional thickness section into:
   a first increased cross-sectional thickness section that is adjacent a first side of the pair of opposite tip shroud sides and defines a first interlock surface; and
   a second increased cross-sectional thickness section that is adjacent a second side of the pair of opposite tip shroud sides and defines a second interlock surface.

3. A method in accordance with claim 2 wherein removing a portion of the increased cross-sectional thickness section comprises:
   forming a first support member that facilitates supporting the first increased cross-sectional thickness section; and
   forming a second support member that facilitates supporting the second increased cross-sectional thickness section.

4. A method in accordance with claim 1 wherein removing a portion of the increased cross-sectional thickness section comprises:
   forming a first increased cross-sectional thickness section that is adjacent a first side of the pair of opposite tip shroud sides and defines a first interlock surface;
   forming a second increased cross-sectional thickness section that is adjacent a second side of the pair of opposite tip shroud sides and defines a second interlock surface; and
   forming a third increased cross-sectional thickness section that extends between the first and second.

5. A method in accordance with claim 1 wherein providing a rotor blade comprises providing a rotor blade wherein the tip shroud includes at least two seal teeth extending outward therefrom, wherein each of the at least two seal teeth extend along at least a portion of the tip shroud circumferential width.

6. A method in accordance with claim 1 wherein removing a portion of the increased cross-sectional thickness section comprises removing at least a portion of the increased cross-sectional thickness section using an electron discharge machining (EDM) process.

7. A rotor blade comprising:
an airfoil extending radially between a blade root and a blade tip; and
a tip shroud extending from said blade tip, said tip shroud comprising:
a pair of opposite sides;
a circumferential width measured between said pair of opposite sides;
a first section of increased cross-sectional thickness relative to at least some adjacent portions of said tip shroud, said first cross-sectional thickness section is adjacent to a first side of said pair of opposite sides and defining a first interlock surface that forms a portion of said first side;
a second section of increased cross-sectional thickness relative to at least some adjacent portions of said tip shroud, said second cross-sectional thickness section is adjacent to a second side of said pair of opposite sides and defining a second interlock surface that forms a portion of said second side;
an intermediate portion extending along said circumferential width between said first and second increased cross-sectional thickness sections, said intermediate portion comprising a reduced cross-sectional thickness relative to said first and second increased cross-sectional thickness sections; and
a third section of increased cross-sectional thickness section relative to at least some adjacent portions of said tip shroud, said third increased cross-sectional thickness section extending along said tip shroud circumferential width between said first and second increased cross-sectional thickness sections such that said third increased cross-sectional thickness section connects said first and second increased cross-sectional thickness sections.

8. A rotor blade in accordance with claim 7 wherein said third increased cross-sectional thickness section divides said intermediate portion into a pair of opposite intermediate sections.

9. A rotor blade in accordance with claim 7 wherein said tip shroud further comprises a first support member that facilitates supporting said first increased cross-sectional thickness section and thereby facilitates supporting said first interlock surface, and a second support member that facilitates supporting said second increased cross-sectional thickness section and thereby facilitates supporting said second interlock surface.

10. A rotor blade in accordance with claim 7 wherein a first side of said pair of opposite tip shroud sides comprises a convex shape and a second side of said pair of opposite tip shroud sides comprises a concave shape.

11. A rotor blade in accordance with claim 7 wherein said tip shroud comprises at least two seal teeth extending outward therefrom, wherein each of said at least two seal teeth extend along at least a portion of said tip shroud circumferential width, and wherein said first increased cross-sectional thickness section, said second increased cross-sectional thickness section, and said intermediate portion each extend along said tip shroud circumferential width between an adjacent pair of said at least two seal teeth.

12. A rotor comprising:
a rotor disk; and
a plurality of circumferentially-spaced rotor blades extending from said rotor disk, each said rotor blade comprising:
an airfoil extending radially between a blade root and a blade tip; and
a tip shroud extending from said blade tip, said tip shroud comprising:
a pair of opposite sides;
a circumferential width measured between said pair of opposite sides;
a first section of increased cross-sectional thickness relative to at least some adjacent portions of said tip shroud, said first cross-sectional thickness section is adjacent to a first side of said pair of opposite sides and defining a first interlock surface that forms a portion of said first side;
a second section of increased cross-sectional thickness relative to at least some adjacent portions of said tip shroud, said second cross-sectional thickness section is adjacent to a second side of said pair of opposite sides and defining a second interlock surface that forms a portion of said second side;
an intermediate portion extending along said circumferential width between said first and second increased cross-sectional thickness sections, said intermediate portion comprising a reduced cross-sectional thickness relative to said first and second increased cross-sectional thickness sections; and
a first support member that facilitates supporting said first increased cross-sectional thickness section and thereby facilitates supporting said first interlock surface, and a second support member that facilitates supporting said second increased cross-sectional thickness section and thereby facilitates supporting said second interlock surface.

13. A rotor in accordance with claim 12 wherein said tip shroud further comprises a third section of increased cross-sectional thickness section relative to at least some adjacent portions of said tip shroud, said third increased cross-sectional thickness section extending along said tip shroud circumferential width between said first and second increased cross-sectional thickness sections such that said third increased cross-sectional thickness section connects said first and second increased cross-sectional thickness sections.

14. A rotor in accordance with claim 13 wherein said third increased cross-sectional thickness section divides said intermediate portion into a pair of opposite intermediate portions.

15. A rotor in accordance with claim 12 wherein a first side of said pair of opposite tip shroud sides comprises a convex shape and a second side of said pair of opposite tip shroud sides comprises a concave shape.

16. A rotor in accordance with claim 12 wherein said tip shroud comprises at least two seal teeth extending outward therefrom, wherein each of said at least two seal teeth extend along at least a portion of said tip shroud circumferential width, and wherein said first increased cross-sectional thickness section, said second increased cross-sectional thickness section, and said intermediate portion each extend along said tip shroud circumferential width between an adjacent pair of said at least two seal teeth.

* * * * *